A. J. HELMS.
MITER TOOL.
APPLICATION FILED JAN. 18, 1915.
1,191,896.
Patented July 18, 1916.
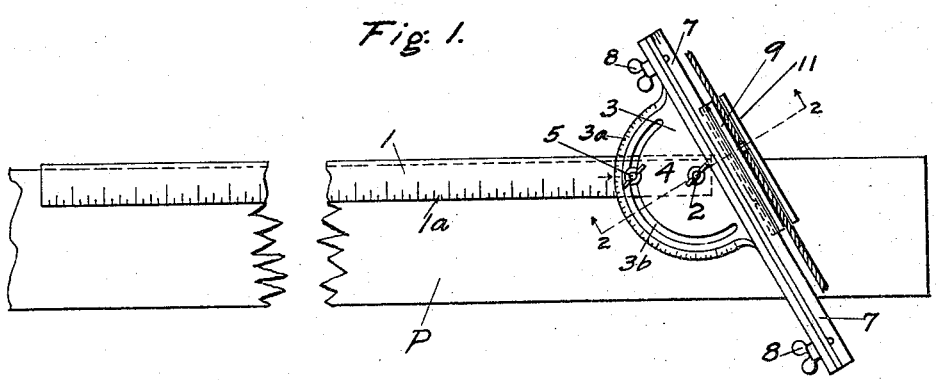
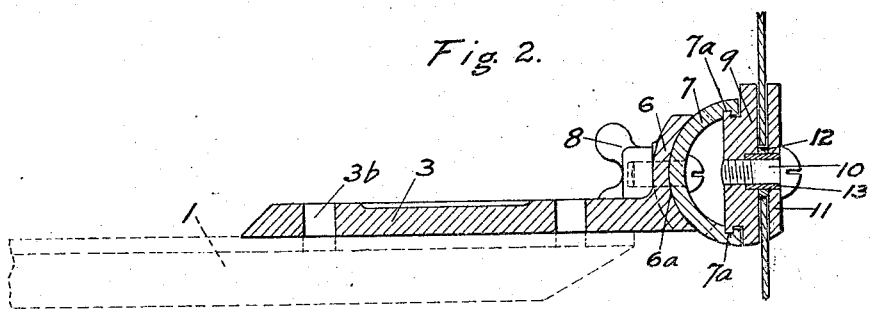
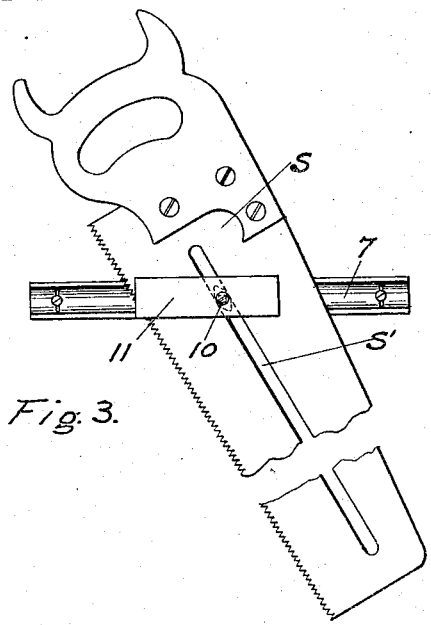
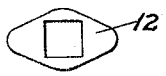
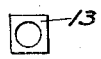
Witnesses:
J. C. Strong
W. Strong
Arthur J. Helms
Inventor,
By _____
Atty.

UNITED STATES PATENT OFFICE.

ARTHUR J. HELMS, OF PORTLAND, OREGON, ASSIGNOR TO BOSS TOOL MFG. CO., A CORPORATION OF OREGON.

MITER-TOOL.

1,191,896.     Specification of Letters Patent.     Patented July 18, 1916.

Application filed January 18, 1915. Serial No. 2,773.

*To all whom it may concern:*

Be it known that I, ARTHUR J. HELMS, a citizen of the United States, residing in the city of Portland, county of Multnomah, and State of Oregon, have invented certain new and useful Improvements in Miter-Tools, of which the following is a specification.

My invention relates to miter tools, and more particularly to a combination square and miter tool, and it has for its principal object to provide a combination tool of the character referred to which can be carried around with a kit of tools, and which can be readily adjusted for cutting a piece of lumber or molding at various angles for making miter joints, or for making square cuts, no matter what is the size of the piece to be cut.

The main features of my invention may be referred to as a straight edge member, preferably of angle iron form, an adjustable miter member attached thereto and adjustable to different angles with relation thereto, a guide member adjustably attached to said miter member and adjustable to various angles relative to the vertical when said tool is being used in a horizontal position, and a saw holder slidably connected to said guide member and adapted to hold a saw in operative position.

In order that others may thoroughly understand my invention, I have shown in the accompanying sheet of drawings one practical form thereof, which I will now describe.

Figure 1 is a top plan view of a miter tool embodying my invention, and shown applied to the top side of a board or plank P; Fig. 2 is a vertical sectional view through the device, taken on line 2—2 of Fig. 1, with the straight edge member indicated in dotted lines; Fig. 3 is a side elevation of a saw, with a portion thereof broken out to reduce the size of the figure, and adapted to have attached thereto what I will call a saw holder which has a sliding engagement with the guide member of the miter member; and Figs. 4 and 5 are details.

Referring now more in detail to the drawings, the embodiment of the invention as here illustrated comprises a straight edge member 1 here shown of angle iron form, with its wider side provided with graduation marks, as $1^a$, similar to the long arm of a carpenter's square. This straight edge member is readily applied to a corner of a board, as indicated in Fig. 1, or a small piece of molding may be placed in the angle of the straight edge member, as will be readily understood. Pivotally attached at one end thereof, as by means of a screw and thumb nut 2, is a semi-circular base plate 3 of a miter member 4, said base being provided around its circular edge with graduation marks, as at $3^a$, and also having formed therein a semi-circular slot $3^b$, within which moves a screw and thumb nut 5, attached to said straight edge member 1, whereby to adjust said members to different angles relative to each other, and to lock them in such adjusted position by means of the thumb nut 5. Said base 3 is provided at one side with a straight extension member 6, having in the present form, a concaved bearing face, as $6^a$. Adjustably mounted in said bearing face $6^a$ is a semi-tubular guide member 7, said member being adjustable by means of slot and screw connections, as at 8—8, about its longitudinal axis, and is provided in its inner face, near its edges, with guideways, as $7^a$. Slidably mounted in said guide member 7 is a slide member 9, to which is attached, as by means of a screw 10, a guide plate 11. A saw S is provided with a longitudinally extending slot S', and is thus adapted to be operated between said slide member 9 and said guide plate 11. To this end a spacing member 12, slightly thicker than the saw blade, is mounted between said slide member 9 and said guide plate 11, within the slot S' of the saw, said piece being shown in Fig. 4, and of a form which has a purpose hereinafter referred to. Said spacing piece 12 is provided with a square hole through which is a square sleeve 13, shown in Fig. 5. The bolt passes through said sleeve 13, which extends through said spacing piece 12, and the slot S' in the saw moves over said spacing piece 12, in the manner indicated.

The sliding member 9 and the guide plate 11, together constitute a saw holder which is slidable with the saw in the guide member 7, and is readily detached with the saw from the miter guide member 7 by sliding it out at either end thereof. By means of the thumb nuts 8—8, said guide member 7 can be turned about its longitudinal axis, in the concaved face of the member 6, whereby to adjust the saw into any desired angle from the vertical when the tool is being used in a general horizontal position.

By means of the thumb nut 5, through the circular slot 3$^b$, the miter member 4, carrying the saw holding mechanism, can be adjusted to various angles relative to the straight edge member 1. The shape of the spacing piece 12, is shown to be diamond shape, or longer than it is wide. This prevents the saw from turning on the same and falling down with the handle below whenever the saw is released. The square hole and the square sleeve 13 prevent the spacing piece 12 itself from turning, while the length of the piece 12 prevents the saw from turning thereon.

Thus I have provided a simple, practical and highly efficient portable combination square and miter tool which can be carried with other hand tools in a kit, and readily applied to a piece of lumber which it is desired to saw square off, or for a miter joint, and while many changes can be made in the embodiment of the invention here shown for illustrative purposes, I do not limit the invention to this particular form, except as I may be limited by the hereto appended claims.

I claim:

1. A miter tool of the character referred to, comprising a straight edge member, a miter member adjustably connected thereto and adapted to be adjusted about an axis extending transversely of said straight edge member, a guide member adjustably attached to said miter member, and a saw holder mounted to slide freely in said guide member, said saw holder being adapted to hold a saw adjustably about an axis extending transversely of the saw blade, whereby said saw can be operated in any position in said saw holder.

2. A miter tool of the character referred to, comprising a straight edge member, a miter member pivotally connected to the end thereof, and adapted to be adjusted about an axis extending transversely of said straight edge member, a guide member adjustably attached to said miter member and adjustable about its longitudinal axis, and a saw holder mounted to slide freely in said guide member, said saw holder being adapted to hold a saw adjustable about an axis extending transversely of the saw blade, whereby said saw can be operated in any position in said saw holder.

3. In a miter tool, a miter member, a guide member adjustably mounted thereon and adjustable about its longitudinal axis, said guide member being provided with a slideway along its straight outer side, and a saw holder mounted to slide freely in said slideway longitudinally of said guide member, said saw holder being adapted to hold a saw so that it can be turned in its own plane to any position about an axis extending transversely of the saw blade.

4. In a miter tool, in combination, a straight edge member, a miter member pivotally mounted thereon, a guide member of tubular form adjustably mounted on said miter member and adjustable about its longitudinal axis, said guide member having a straight outer edge and provided with a slideway therealong, a saw holder mounted to slide freely along said slideway, and means pivotally holding a saw in said saw holder, whereby said saw can be adjusted to any position in its own plane about an axis extending transversely of said saw blade.

5. A miter tool comprising a straight edge member, a miter member connected to one end thereof and adapted to be adjusted to different angles relative thereto about an axis extending transversely of said straight edge member, a guide member attached to said miter member and adjustable about its longitudinal axis, said guide member having its outer side square, whereby to rest squarely upon a flat surface in a plane at an angle to the planes of the straight edge and miter members, and a saw holding member mounted to slide freely along said guide member, said saw holding member being adapted to pivotally support a saw adjustably about an axis extending transversely of said saw blade, whereby said saw can be adjusted to different angles in its own plane.

6. A miter tool comprising a straight edge member, a miter member connected to one end thereof and adapted to be adjusted to different angles relative thereto about an axis extending transversely of said straight edge member, a guide member attached to said miter member and adjustable about its longitudinal axis, said guide member having its outer side square, whereby to rest squarely upon a flat surface in a plane at an angle to the planes of the straight edge and miter member, and means for holding a saw blade operatively in said guide member in a plane parallel with the plane of the square side of said guide member.

7. A miter tool of the character referred to, comprising a straight edge member, a miter member pivotally connected to one end thereof and adjustable about an axis extending transversely of said straight edge member to different angles relative thereto, a guide member of semi-tubular form mounted upon said miter member and adjustable about its longitudinal axis relative to said miter member, said guide member having its outer side straight, and means for operatively holding a saw blade in said guide member in a plane parallel with the plane of the outer side of said guide member.

Signed at Portland, Multnomah county, Oregon, this 13th day of January, 1915.

ARTHUR J. HELMS.

In presence of—
ETHEL C. GRAHAM,
SANDERSON REED.